No. 756,662. PATENTED APR. 5, 1904.
J. B. LESTER.
SAW SET.
APPLICATION FILED AUG. 15, 1903.
NO MODEL.
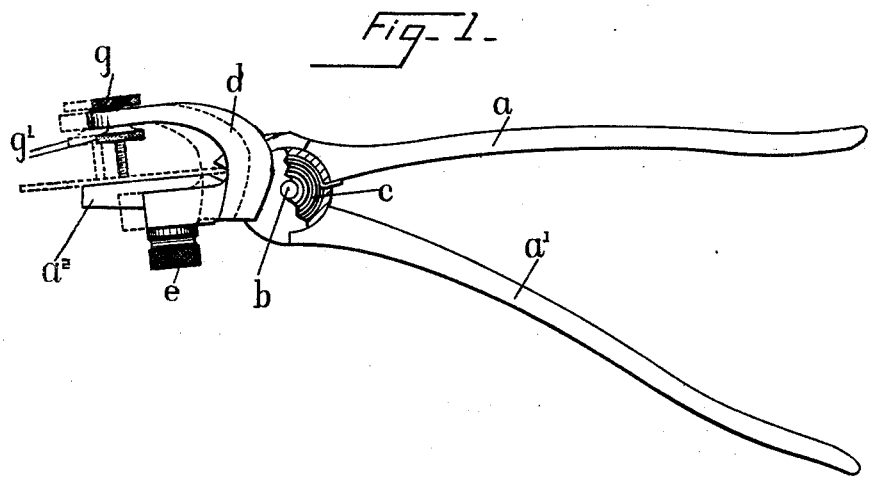
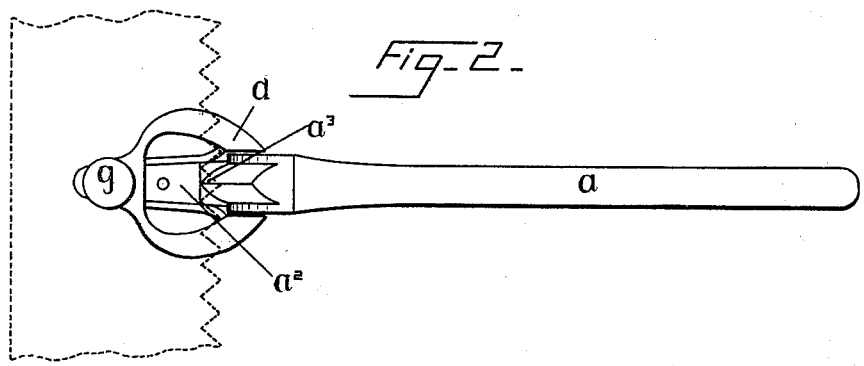
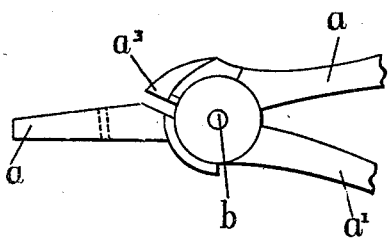
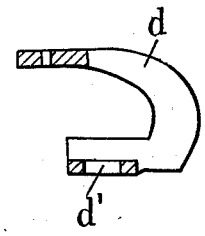
Witnesses
Frank S. Dewire
May F. Ritchie
Joseph B. Lester, Inventor,
by Frank H. Allen
Attorney No. 756,662. Patented April 5, 1904.

UNITED STATES PATENT OFFICE.

JOSEPH B. LESTER, OF NORWICH, CONNECTICUT.

SAW-SET.

SPECIFICATION forming part of Letters Patent No. 756,662, dated April 5, 1904.

Application filed August 15, 1903. Serial No. 169,628. (No model.)

*To all whom it may concern:*

Be it known that I, JOSEPH B. LESTER, a citizen of the United States, residing at Norwich, in the county of New London and State of Connecticut, have invented certain new and useful Improvements in Saw-Sets, of which the following is a specification, reference being had to the accompanying sheet of drawings, in which—

Figure 1 is a side view of a saw-set embodying my present improvements, and Fig. 2 is a top or plan view of the same. Fig. 3 is a side view of the hinged jaws of the set, the adjustable gage having been removed. Fig. 4 is a detached central vertical sectional view of said gage.

The object of this invention is to provide a simple, cheap, and serviceable saw-set in the form of a hand implement that may be readily adjusted for use with coarse or fine saw-teeth and to give more or less "set" to such teeth, as may be desired.

My said improvements are mounted upon or embodied in an implement consisting of two principal members $a$ $a'$ of handle form, that are hinged together by means of a pivot-screw $b$ and are held normally open by a suitable spring, here shown as a barrel-spring $c$, that is housed within the said hinge-joint, as indicated in Fig. 1. The lower jaw $a^2$ is extended an inch, or thereabout, and has slidably mounted thereon a frame $d$, that serves as a stop or gage to limit the entrance of the saw into the set. The gage $d$ is secured to the lower jaw $a^2$ by a thumb-screw $e$, that passes through a slot $d'$ in the said gage, (see Fig. 4,) and it will now be understood that by partially unscrewing the thumb-screw $e$ the gage $d$ may be adjusted outward or inward upon the jaw $a^2$ within the limits of the slot $d'$. (See dotted lines in Fig. 1.) The gage $d$ is formed as an open frame in its upper portion, as seen in Fig. 2, so that the setting-jaw of the implement, as well as the saw-tooth that is being acted upon, may be viewed during the setting operation.

In the overhanging free end portion of the gage $d$ is a screw $g$, on which is preferably a check-nut $g'$. When the implement is in use, the screw $g$ is so adjusted that the saw-blade may be easily inserted between the end of said screw and the upper side of the extended jaw $a^2$, the said upper side of the jaw being so formed that the saw-tooth is presented to the upper or setting jaw $a^3$ at an angle, as shown in Fig. 1, in which figure the saw-blade is indicated by dotted lines.

When the jaws of the implement close upon the tooth, the latter is set, or, in other words, is bent out of the plane of the body or blade of the saw. Meanwhile the toothed edge of the saw-blade engages the side walls of the gage-frame $d$, and the entrance of the tooth between the jaws is thus limited and all of the teeth are successively set alike. By adjusting the gage-frame $d$ outward or inward teeth of greater or lesser depth may be set.

My described implement is of simple construction, and its operative parts are so arranged that they may be viewed by the operator during the setting operation.

Having thus described my invention, I claim—

The improved saw-set herein described consisting of a pair of pivoted jaws the lower one of which is extended to form an extended saw-support, an open bow-shaped frame having lateral bowed portions, said frame embracing and slidably mounted on the said lower jaw independently of the upper jaw and having its upper overhanging free end portion extended above the extended portion of the lower jaw, said frame having its bow portion extended backward in proximity to the pivot of the jaws and having a lower forward extension parallel with the upper overhanging portion and having a flat bearing against the under face of the extension of the lower jaw, a screw mounted in the said overhanging end opposite the base of the extended support, and a screw out of vertical alinement with said screw and engaged in the extended lower horizontal portion of the frame and forward of the bow of said frame and in the extension of the lower jaw, all substantially as shown and described.

In testimony whereof I have signed my name to this specification in the presence of two subscribing witnesses.

JOSEPH B. LESTER.

Witnesses:
 FRANK S. DEWIRE,
 MAY F. RITCHIE.